United States Patent [19]
Mather

[11] Patent Number: 5,286,140
[45] Date of Patent: Feb. 15, 1994

[54] BIOREMEDIATION SYSTEMS AND METHODS

[75] Inventor: Eric C. Mather, Cincinnati, Ohio

[73] Assignee: Petro Environmental Technologies, Inc., West Chester, Ohio

[21] Appl. No.: 992,425

[22] Filed: Dec. 17, 1992

[51] Int. Cl.⁵ .................. E02D 31/00; B09B 3/00
[52] U.S. Cl. ................... 405/128; 210/610; 210/747; 405/258
[58] Field of Search .............. 405/52, 128, 129, 258, 405/264; 210/170, 747, 610, 611, 901

[56] References Cited

U.S. PATENT DOCUMENTS

| | | | |
|---|---|---|---|
| 4,765,902 | 8/1988 | Ely et al. | 405/128 X |
| 4,849,360 | 7/1989 | Norris et al. | 405/128 X |
| 4,850,745 | 7/1989 | Hater et al. | 405/258 |
| 4,919,570 | 4/1990 | Payne | 405/128 |
| 5,039,415 | 8/1991 | Smith | 405/128 X |
| 5,120,160 | 6/1992 | Schwengel | 405/128 |

OTHER PUBLICATIONS

R. R. Dupont, "Application of Bioremediation Fundamentals to the Design and Evaluation of In-Situ Soil Bioventing Systems", Jun. 21-26, 1992, pp. 1-15.
Texas Research Institute, "Enhancing The Microbial Degradation of Underground Gasoline By Increasing Available Oxygen", Feb., 1982, pp. 1-25.
Roy F. Weston Inc., "Remedial Technologies For Leaking Underground Storage Tanks", 1988, pp. 37-52. Section 6, "Bioreclamation", pp. 1-39 (author, date, source unknown).

*Primary Examiner*—David H. Corbin
*Attorney, Agent, or Firm*—Wood, Herron & Evans

[57] ABSTRACT

Bioremediation systems and methods are disclosed in which petroleum contaminated soil (PCS) are treated and recycled to below acceptable contaminant levels. The system comprises a treatment cell at a location removed from the original site of the contaminated soil and having a capacity to receive and treat PCS from numerous sources concurrently. The system includes a treatment water infiltration system and an air circulation system which, in combination, supply the required oxygen and nutrients to enhance the growth of naturally occurring, hydrocarbon-consuming microbial organisms as well as optimizing the hydrocarbon consuming activity of those organisms. The pH, system temperature, and growth inhibiting toxin concentration are all controlled in the systems and methods of the present invention to thereby further enhance microbial growth and hydrocarbon consumption.

12 Claims, 2 Drawing Sheets

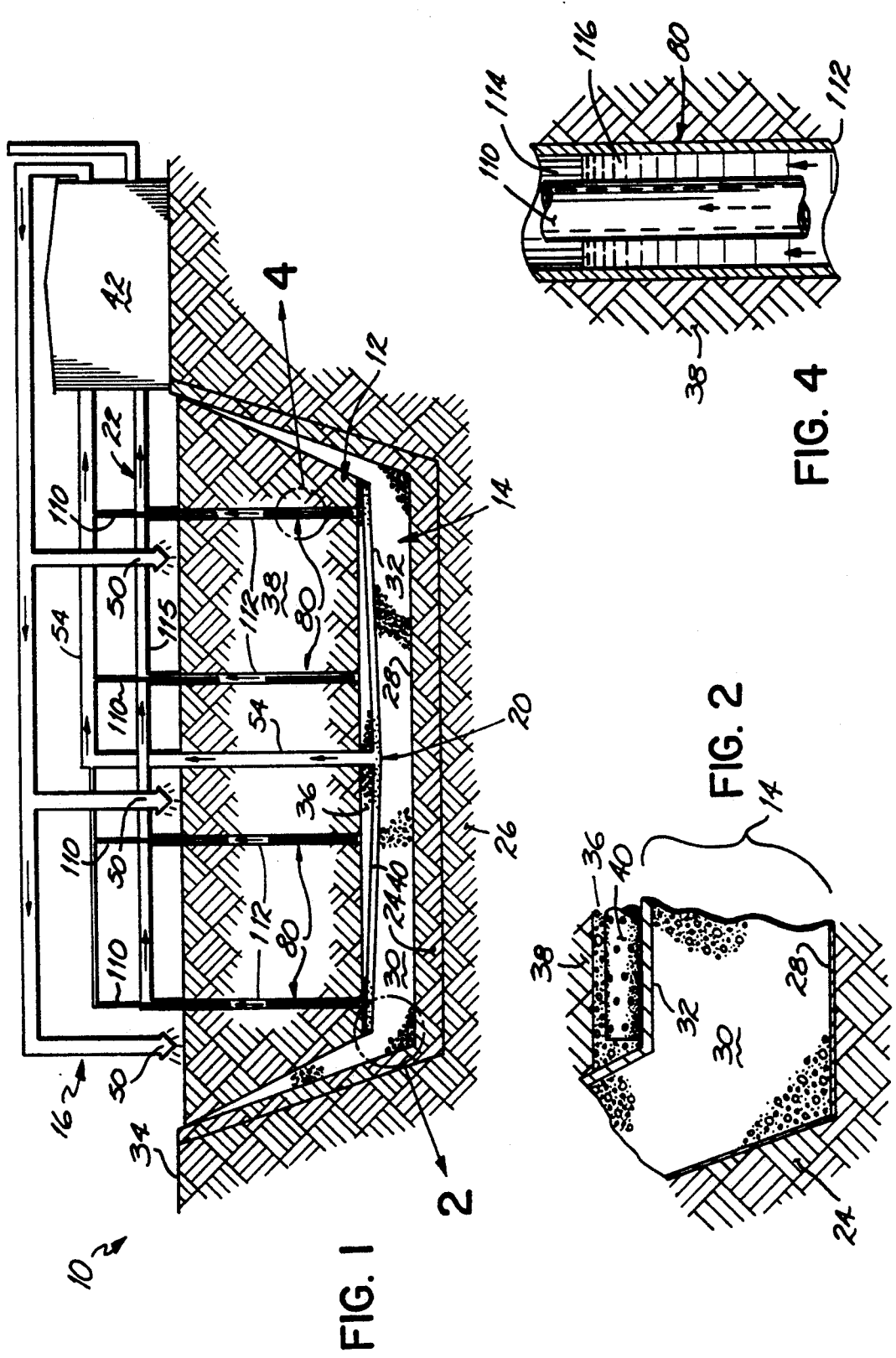

BIOREMEDIATION SYSTEMS AND METHODS

FIELD OF THE INVENTION

The present invention is directed to bioremediation systems and methods, and more particularly to systems and methods which are operated at locations removed from soil contamination sites wherein naturally occurring microorganisms are utilized under controlled conditions to break down petroleum contaminants in the soil.

BACKGROUND OF THE INVENTION

Bioremediation is a term used to describe processes which make use of certain types of bacterial microorganisms which "consume" hydrocarbons in the presence of oxygen to convert the hydrocarbon to $CO_2$: and water, according to the following general equation:

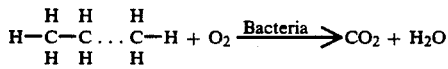

Bioremediation has thus been shown to be an effective method, in general, for treating petroleum contaminated soil (PCS). Bioremediation is being used more commonly in the treatment of PCS due to increasingly stringent state and federal regulations regarding environmental contamination, and particularly regarding underground storage tanks for petroleum and petroleum-based products.

The number of underground petroleum storage tanks in the United States and throughout the world is astounding. Over time, these tanks develop leaks which contaminate the surrounding soil with petroleum hydrocarbons. Since this creates a significant environmental hazard, regulations have been implemented to prevent such contamination and to require the clean up of such contamination.

U.S. Pat. No. 4,850,745 describes an in situ or "on site" bioremediation system in which a leaking tank (containing gasoline or other petroleum hydrocarbon) is removed, leaving a cavity in the ground. The soil remaining in the tank cavity is leveled and dry form bacteria cultures are distributed over the soil surface. Thereafter, a layer of pea gravel is spread over the applied dry culture and a system of distribution piping is laid out on top of the pea gravel. Finally, another layer of pea gravel is placed over the installed piping and fill dirt and reconstruction relating to installation of a new tank takes place. This type of in situ system does not address the reclamation of the contaminated soil which is removed from the site when the tank is removed. Furthermore, systems of this type require construction at every site where a tank is removed. Finally, in high ground water areas this dry remediation approach is inappropriate.

With the continuing emphasis on control and clean up of environmental contamination, bioremediation systems and methods are needed which are centrally located and provide the capacity to reclaim large volumes of PCS with the resulting soil being suitable for reuse subsequent to reclamation thereof, thereby obviating the need to dispose of PCS in landfills or utilize undesirable thermal degradation processes.

SUMMARY OF THE INVENTION

The bioremediation systems and methods of the present invention overcome the various drawbacks described above and provide advantageous means for reclaiming large volumes of PCS in a centralized location to meet governmentally imposed standards for "clean" soil.

In its broadest aspects, the system of the present invention comprises a large capacity, in-ground treatment cell for receiving PCS from virtually any source. The cell provides a containment liner which prevents contamination of the soil surrounding the treatment cell itself. The system is further provided with a fluid circulation loop and an oxygen distribution system. The fluid circulation loop is an infiltrating treatment water loop in which water enriched with hydrocarbon-consuming bacteria is distributed over the surface of the PCS in the treatment cell and percolates downwardly through the soil, solubilizing away a portion of the contaminating petroleum hydrocarbon. The infiltrating treatment water preferably contains an elevated concentration of nutrient additives which feed the cultivated and naturally occurring microorganisms present in the PCS to stimulate growth of and enhance the bioremediative action of the microorganisms. The water/petroleum is recovered from the cell via a cell recovery well or wells, fed through a suitable oil/water separator/clarifier and into a bioreactor. The treatment water loop is also provided with monitoring ports which facilitate monitoring the composition of the treatment water for hydrocarbon content, pH, heavy metals, as well as to ensure the appropriate nutrient levels.

The system is further provided with an oxygen distribution system, preferably a vacuum system, which draws atmospheric air (22% oxygen) through the soil to deliver oxygen to the microorganisms to further enhance the bioremediation or bio-consumption of the hydrocarbons in the PCS. With certain soil conditions, a positive air injection system may be used to deliver the necessary atmospheric oxygen, rather than a vacuum system.

The naturally-occurring hydrocarbon degradation process (bioremediation) is generally affected by the following factors: 1) the concentration of hydrocarbon-degrading microorganisms; 2) oxygen availability; 3) nutrients for the microorganisms; 4) system pH; 5) system temperature; and 6) competition, including the presence of toxins and bacteria growth inhibitors. The system and method of the present invention are designed to address and control each of these potentially inhibiting factors to provide an optimum system for the reclamation of PCS.

More particularly, the concentration of hydrocarbon-degrading microorganisms, which are most commonly bacteria of the genera Pseudomonas and Arthrobacter, is related to the oxygen availability and the presence of nutrients. The speed with which a specified quantity of PCS can be reclaimed to environmentally acceptable levels in turn depends predominantly on the amount of hydrocarbon-degrading microorganisms present. That is, the more organisms present per volume of PCS the faster will be the bioremediation process. Thus, it is one objective of the system and method of the present invention to stimulate the growth of the naturally-occurring organisms present in the PCS to increase the rate of hydrocarbon consumption and PCS reclamation. This is accomplished by controlling the oxygen supply to the bioremediation bacteria. The hydrocarbon in the PCS is metabolized (oxidized) by the bacteria and is a food source for the bacteria. The bacteria multiply by cellular division and grow utilizing the excess energy from the hydrocarbon metabolism. The system accomplishes this oxygen supply by either drawing oxygen-containing ambient air through the soil by means of a vacuum system or by positively forcing air through the soil by utilizing a suitable blower.

The presence of nutrients is necessary for growth of the bioremediation microorganisms. Nutrients which may be required for microbial metabolism include nitrogen, phosphorus, potassium, magnesium, calcium, sulfur, sodium, manganese, iron and trace metals. These nutrients are typically already present in the soils being treated and may not need to be supplemented. However, nitrogen and phosphorus are frequently present in limiting concentrations and may need supplementation. The system and method of the present invention provide for the monitoring of nutrient levels and, when necessary, the appropriate nutrients are added to the treatment water stream.

It has been determined that optimum microbial activity for bioremediation occurs within a pH range of 6.0 to 9.0, with slightly alkaline conditions being more favorable. The system of the present invention includes means for monitoring the pH of the recovered water from the treatment cell, which is believed to be representative of the treatment system pH. If the system pH deviates from the 6.0 to 9.0 range, suitable quantities of inorganic salts may be added to the system to adjust the pH to the desired levels.

It has further been determined that the temperature range of about 20° to 37° C. is optimal for microbial organism growth in aerobic treatment processes. However, various factors may contribute to deviation of the temperature from this optimal range. For example, the metabolic activity of the microorganisms increases the temperature of the system, and, during periods when the ambient temperature is less than optimal, the air circulation driven by the vacuum system may cause excessive cooling. Thus, it is necessary to control the system temperature to be within the optimal range. This is accomplished in the system of the present invention by adjusting the rate at which the infiltrating treatment water is recovered and recirculated through the infiltration system, and by limiting air movement in the treatment process to maintain optimal biological activity.

The final factor mentioned above with respect to hydrocarbon degradation and microbial growth is the competition with and inhibition of bacterial growth. Since heavy metals are one potential bacteria growth inhibitor, the system of the present invention may include a heavy metals precipitation tank or clarifier which reduces the concentration of metals in the infiltration treatment water stream.

Having described the system of the present invention, the method of operation thereof will now be described. A treatment cell comprising a suitable, substantially fluid-impervious containment liner for PCS is provided; the cell may have a capacity on the order of 200 to 200,000 tons or more of PCS. The PCS removed from contamination sites is deposited in the treatment cell and infiltrating treatment water enriched with nutrients and acclimated cultures of hydrocarbon-containing bacteria is applied thereto, dispersed by a plurality of supply nozzles which distribute the treatment water over the surface of the PCS. The treatment water percolates through the soil and is recovered via a cell recovery well (or wells) which is provided with a pump that pumps the recovered water out of the cell. The recovered water, which may contain some petroleum, and/or other contaminants, is passed through an oil/water separator/clarifier to remove the petroleum therefrom. The recovered water is monitored for pH level, heavy metals and nutrient content. If it is necessary to adjust the pH or reduce the metals content in the treatment water, this is accomplished by means of adding suitable chemicals, such as salts or flocculants, etc., to the treatment water, a recirculation loop may be provided for this purpose. The water is then pumped into a bioreactor which contains the acclimated hydrocarbon-consuming bacteria. Additional nutrients for the bacteria may also be supplied to the bioreactor from a separate source. The infiltrating water loop is completed by pumping treatment water to the sprinkler nozzles.

Typically, prior to start-up of a PCS treatment cycle, the bioreactor is put into service to develop a culture of acclimated hydrocarbon-consuming bacteria. Acclimation of bacteria utilized in biodegradation processes is a technique well known in the art. In the present application, the bioreactor is initially spiked with soils or water known to contain hydrocarbon-consuming bacteria. Thereafter, oxygen (air), nutrient, and a suitable food supply (hydrocarbons) are added to the bioreactor until the bacterial culture in the reactor is elevated to an adequate level, which may be approximately $10^5$-$10^7$ bacteria per unit volume of water, as measured in a typical bacteria plate count. The elevated bacteria culture level is maintained in the bioreactor and the treatment water used in the system of the present invention passes through the bioreactor to become enriched in the bacteria. The bacteria-enriched water is then distributed on the PCS in the treatment cell to ensure that the bacteria are omnipresent therein.

Concurrent with the infiltrating water treatment, oxygen is supplied to the PCS to enhance microbial growth of the naturally occurring hydrocarbon-consuming bacteria by means of a suitable air processing system comprising either a vacuum system or blower system. In either case, the oxygen is supplied to the PCS from the ambient air and is either drawn through or forced through the soil by a pumping system.

The systems and methods of the present invention are most preferably operated on a continuous schedule, 24 hours per day, 7 days per week, as needed. Sampling of the treatment water composition is performed on a daily basis to ascertain the chemical quality of the contamination remaining in the water, which is believed to be indicative of the contamination levels remaining in the soils.

Having thus described in general terms the systems and methods of the present invention, a more detailed description of the invention is now provided with reference to the accompanying figures.

BRIEF DESCRIPTION OF THE DRAWINGS

FIG. 1 is a schematic representation, in partial cross-section, of a system of the present invention;

FIG. 2 is an enlarged cross-sectional view of that portion of FIG. 1 shown encircled by dotted line 2;

FIG. 4 is an enlarged cross-sectional view of that portion of FIG. 3 shown encircled by dotted line 4.

DETAILED DESCRIPTION OF THE INVENTION

Figure 3:
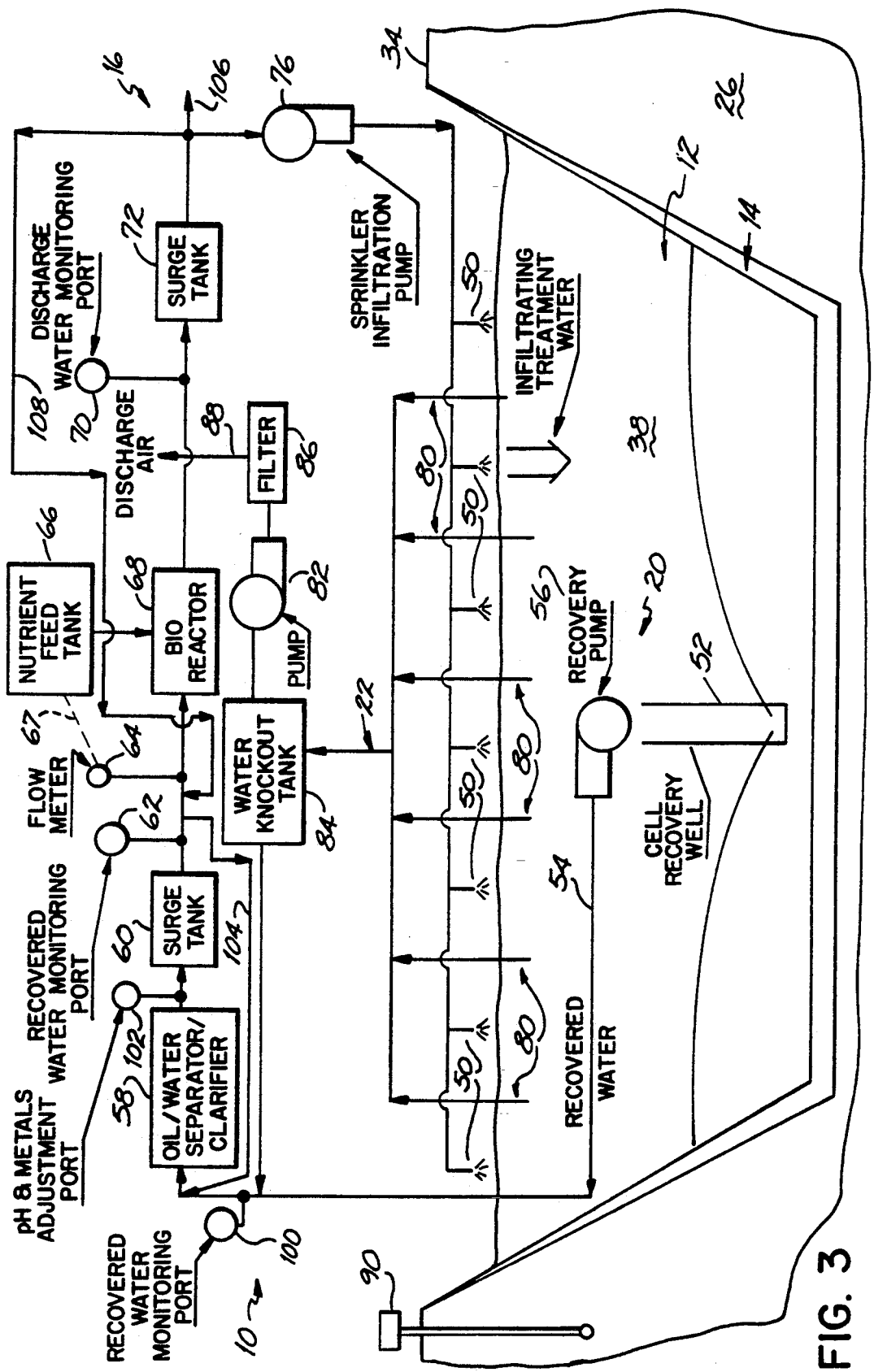
FIG. 3 is a schematic representation of the system of the present invention, including both fluid and gaseous circulation loops.

FIG. 1 shows a diagrammatic representation of a bioremediation system in accordance with the principles of the present invention. As shown, the system 10 comprises a treatment cell or in-ground cavity 12 which has a containment liner generally designated 14 to prevent contamination of the surrounding earth. The system further includes an infiltration treatment water system 16 which includes means for distributing water over the surface of the PCS 38 contained in treatment cell 12 and water recovery means 20 through which the treatment water is extracted from the PCS and circulated through additional processing equipment which will be described in more detail below. Finally, the system includes an oxygen/air distribution system 22 by means of which oxygen present in the ambient air is distributed and supplied to the PCS to enhance microbial growth and hydrocarbon degradation activity of the bacteria within the PCS.

FIG. 2 is an enlarged cross-sectional view of a portion of the containment liner 14 which defines treatment cell 12. The cell liner consists of a layer of compacted clay 24 which lines the cavity containing the treatment cell 12 and provides the initial barrier to the influx of ground water from the surrounding earth 26. Compacted clay layer 24 is lined with a suitable water/oil impervious layer which is not subject to deterioration under the conditions present in the treatment cell. A preferred material for this liner 28 is high density polyethylene sheet having a thickness of about 20 mil. A layer of pea gravel 30 is provided over liner 28 and defines an interstitial zone wherein certain monitoring capabilities are performed, as described more fully below. Inside of pea gravel layer 30, there is provided an additional water/oil impervious layer 32 which may preferably be a 60 mil high density polyethylene sheet. As will be appreciated, and as shown in FIG. 1, these various liner components line the entire treatment cell including the bottom surface and all of the vertical or substantially vertical side walls up to the ground surface level 34, thereby providing complete containment of the PCS which is deposited within treatment cell 12.

A final layer of pea gravel 36 is provided along the bottom surface only of treatment cell 12 and does not extend upwardly along the side walls thereof. Liners of this construction and configuration are expected to have a useful life on the order of about 30 years and are believed to provide excellent retention of the hydrocarbon contaminants contained in the PCS 38 which fills the treatment cell 12.

Treatment water infiltration system 16 includes a plurality of perforated pipes laid along the high density liner 32 and encased in the pea gravel layer 36. These pipes 40 provide the means for collecting the infiltrating treatment water and supplying it via a cell recovery well 52 for further processing.

The details of the infiltration treatment water system and the air/oxygen distribution system are shown in more detail in FIG. 3. The equipment components for both the systems are preferably housed within a suitable structure 42 (see FIG. 1) for purposes of protection thereof and security. Infiltrating treatment water system 16 operates to circulate naturally supplied water, such as rain water, through the PCS 38 in the treatment cell 12. The initial distribution of treatment water over the surface of the PCS 38 is accomplished by means of suitable sprinkler nozzles 50 which evenly distribute the treatment water over the entire surface of the PCS. This treatment water percolates naturally through the PCS until it reaches the bottom of treatment cell 12 where it is recovered primarily by means of a cell recovery well or wells designated generally as 52 which collects the treatment water from the pea gravel layer 36 by means of perforated pipes 40 which extend generally outwardly from a central location in the treatment cell, as shown in FIG. 1. The treatment water may contain some of the hydrocarbon which contaminates the PCS and this liquid mixture is drawn out of treatment cell 12 through a recovery line 54 by means of a suitable liquid recovery pump 56. The liquid is initially passed through an oil/water separator/clarifier 58 to separate the water and hydrocarbon fractions so that the water can be recycled and reused in the system. Just upstream of the oil/water separator/clarifier 58 is a recovered water monitoring port 100, which serves to monitor the pH, metals and nutrient content, as well as hydrocarbon contamination of the water recovered from the treatment cell. The separator/clarifier 58 may also be used to remove heavy metals from the treatment water by the use of flocculants, for example. Just downstream of separator 58, the system may include another port 102 through which salts or other pH-adjusting materials can be added. Furthermore, the metals-removing flocculants may be added to the treatment water via port 102.

The flow of recirculating treatment water is regulated by incorporating a surge tank 60 in the treatment water infiltration system. Downstream of surge tank 60 is another port 62 for monitoring the composition of the recovered water after it has passed through separator/clarifier 58. If need be, some or all of the treatment water may be recirculated via line 104 and again pass through separator/clarifier 58 to further modify the treatment water composition. Recirculation line 104 may include (not shown) additional apparatus and/or ports by means of which the water composition is even further modified.

Treatment water infiltration system is further provided with a flow meter 64 to both monitor the flow rate of the recirculating water and to regulate the rate at which nutrients are to be added to the bioreactor 68. To accomplish this, flow meter 64 is operatively connected to nutrient feed tank 66 as indicated by dotted line 67. Thereafter, the treatment water is fed to bioreactor 68 wherein suitable nutrients are added to the water directly from a nutrient feed tank 66, as controlled by flow meter 64, to provide the required nutrients to stimulate growth of the bacteria within the treatment cell.

Bioreactor 68 is present to remove residual hydrocarbons from the recovered water and to grow additional bacteria which are carried by the water and distributed to the PCS via the sprinkler infiltration nozzles 50. Downstream of the bioreactor 68 is another monitoring port 70 for monitoring the composition of the discharge water, as well as a second surge tank 72 to further control the flow of treatment water through the infiltration system. It is contemplated that the various tanks and other apparatus in the system may be provided with liquid level controls (not shown) to also control the flow of treatment water through the system. Downstream of surge tank 72, the treatment water infiltration system 16 is preferably provided with a water discharge outlet 106 and a water recirculation line 108. By means of the latter, line 108, treatment water may be recirculated to a point upstream of flow meter 64, as shown. The system 16 is further provided with a sprinkler infiltration pump 76 which pumps the desired volume of treatment water to the sprinkler heads 50 to complete the infiltration system loop. In the event of insufficient naturally-supplied water, water can be added to the system from some other external source by supplying it directly to either surge tank 60 or 72. In the event of excess water in the cell, water may be discharged from the system via discharge line 106.

Air processing system 22 is designed to draw ambient air through the PCS or to positively force it through the PCS to enhance the microbial activity by providing sufficient oxygen to both stimulate growth of the bacteria and to oxidize the hydrocarbons in the consumption process. A plurality of vertically extending tube-in-tube lines 80 are provided in treatment cell 12. As shown in FIG. 1, these lines 80 preferably extend down to the upper surface of pea gravel layer 36 or just below that surface.

As shown in detail in FIG. 4, tube-in-tube lines 80 comprise inner and outer tubes 110, 112, respectively, which define an annular space 114 therebetween. Outer tubes 112 are connected to and feed into air return line 115, while inner tubes 110 are connected to and feed into treatment water recovery line 54.

In a preferred embodiment, a vacuum is applied to outer tubes 112 to draw ambient air downwardly through the PCS to provide a continuous source of the oxygen required by the bacteria present in the soil. The air drawn through the PCS passes upwardly through the annular spaces 114, as denoted by the outer arrows in FIG. 4. In this preferred embodiment, a vacuum system is utilized which is designed to pull approximately 0.25-4.0 pore space air changes per day (22% oxygen) through the PCS. A pore space air change is generally calculated by determining the volume of soil in the cell and multiplying that value by an assumed or measured soil porosity. At this delivery rate, the majority of the oxygen is available for bio-consumption through vacuum transport rather than stripping. The vacuum is supplied by a suitable pump 82 (see FIG. 3). The recovered air is fed through a water knock-out tank 84 or demisting tank to remove moisture entrained in the air prior to passing through pump 82. Thereafter, the air is fed through a suitable filter 86, which may be activated carbon or any other suitable filter capable of removing entrained solids and hydrocarbon vapors, prior to discharging the air to the atmosphere via line 88.

The air drawn upwardly through outer tube 112 contains liquid vapor, mist and/or droplets. As this air passes upwardly in annular region 114, at least a portion of the liquid 116 accumulates in the lower segment of each annular region 114, as shown in FIG. 4. As this liquid level increases, it becomes more and more difficult to draw a vacuum through the system. In order to avoid this problem, the present invention incorporates the tube-in-tube arrangement as shown in FIG. 4. Pressure monitors and transducers (not shown) are provided in the system and as the liquid level increases to unacceptably high levels in annular regions 114, suitable valves (not shown) in tubes 110 are opened and a vacuum flush is applied to draw the liquid 116 out of annular regions 114 via inner tubes 110, as represented by the central arrow in tube 110. It is preferable that the air/vacuum circulation is temporarily discontinued during this flushing operation. The flushed liquid is fed to recovered water line 54, and is treated and circulated in the same manner as the water drawn from the treatment cell via recovery well 52. Once the liquid has been flushed from annular regions 114, the valves are closed and the air/vacuum circulation is continued through outer tubes 112.

Utilizing the system of the present invention, reclamation of large quantities of PCS, on the order of 100,000 to 300,000 tons per year, can be accomplished whereby the soil is reclaimed to a level in which governmentally imposed contamination limits are not exceeded. The reclaimed soil is suitable for use as landfill cover, fill dirt, or virtually any other desired application.

The foregoing detailed description is intended to be exemplary of a preferred embodiment of the system of the present invention and is not intended to be limiting in any way of the scope of the invention as defined by the appended claims.

What is claimed is:

1. An offsite system for bioremedation of petroleum contaminated soil (PCS), comprising:
   an in-ground treatment cell for receiving and containing PCS during treatment thereof, said treatment cell including a substantially fluid-impervious containment liner which prevents contamination of soil surrounding said treatment cell by PCS contained in said cell;
   a first fluid system for circulating infiltrating treatment water through PCS contained in said treatment cell to solubilize at least a portion of the contaminating petroleum hydrocarbons from the PCS, to supply cultivated hydrocarbon-consuming microorganisms to the PCS, and to supply nutrients which feed naturally-occurring hydrocarbon-consuming microorganisms present in the PCS to stimulate the growth and enhance the bioremediative action thereof, said first fluid system including
   means for distributing infiltrating treatment water on the PCS, and
   means for recovering from said treatment cell treatment water containing petroleum hydrocarbons solubilized from the PCS; and
   a second gaseous fluid system for delivering oxygen-containing gas to the cultivated and naturally-occurring microorganisms present in the PCS to further enhance the bioremediative action thereof.

2. A system according to claim 1, said first fluid system further comprising:
   means for monitoring the composition of the treatment water for hydrocarbon content, pH, heavy metals and appropriate nutrient levels;
   means for separating hydrocarbons from the treatment water; and
   means for supplying additional nutrients to the treatment water.

3. A system according to claim 3, said first fluid system further comprising:
   a bioreactor for acclimating hydrocarbon-consuming microorganisms and supplying said microorganisms to the PCS via the treatment water.

4. A system according to claim 1, said second gaseous fluid system including:
   vacuum means for drawing ambient air through the PCS.

5. A system according to claim 1, said second gaseous fluid system including:

blower means for positively forcing air through the PCS.

6. A system according to claim 4, said second gaseous fluid system further including tube-in-tube suction lines wherein air and vapors are drawn through one of said tubes and liquids are drawn through the other of said tubes.

7. A method for bioremediation of petroleum contaminated soil (PCS), comprising the steps of:
providing an in-ground treatment cell for receiving and containing PCS during treatment thereof;
preventing contamination of soil surrounding said treatment cell by PCS contained in said soil by means of a substantially fluid-impervious containment liner;
circulating infiltrating treatment water through PCS contained in said treatment cell to solubilize at least a portion of the contaminating petroleum hydrocarbons from the PCS, to supply cultivated hydrocarbon-consuming microorganisms to the PCS, and to supply nutrients which feed naturally-occurring hydrocarbon-consuming microorganisms present in the PCS to stimulate the growth and enhance the bioremediative action thereof, said circulating step including the substeps of
distributing infiltrating treatment water on the PCS, and
recovering from said treatment cell treatment water containing petroleum hydrocarbons solubilized from the PCS; and
delivering oxygen-containing gas to the cultivated and naturally-occurring microorganisms present in the PCS to further enhance the bioremediative action thereof.

8. A method according to claim 7, said circulating step further comprising the substeps of:
monitoring the composition of the treatment water for hydrocarbon content, pH, heavy metals and appropriate nutrient levels;
separating hydrocarbons from the treatment water; and
supplying additional nutrients to the treatment water.

9. A method according to claim 8, said circulating step further comprising the substep of:
acclimating in a bioreactor hydrocarbon-consuming microorganisms and supplying said microorganisms to the PCS via the treatment water.

10. A method according to claim 7, said gas delivering step including:
drawing ambient air through the PCS by means of a vacuum system.

11. A method according to claim 7, said gas delivering step including:
positively forcing air through the PCS by means of a blower system.

12. A method according to claim 10, said gas delivering step further including drawing air and vapors through one tube of a tube-in-tube suction line, and drawing liquids through the other of said tubes.

* * * * *

UNITED STATES PATENT AND TRADEMARK OFFICE
CERTIFICATE OF CORRECTION

PATENT NO. : 5,286,140
DATED : February 15, 1994
INVENTOR(S) : Eric C. Mather

It is certified that error appears in the above-indentified patent and that said Letters Patent is hereby corrected as shown below:

At column 8, line 58, the second occurrence of "3" should be --2--.

Signed and Sealed this

Sixteenth Day of August, 1994

Attest:

BRUCE LEHMAN

Attesting Officer     Commissioner of Patents and Trademarks